Nov. 22, 1932.  C. PEARSON  1,888,468
SELF DUMP RAKE
Filed Aug. 21, 1931  2 Sheets-Sheet 1

Inventor
Charles Pearson
By H.P. Davenote
Atty.

Nov. 22, 1932.  C. PEARSON  1,888,468
SELF DUMP RAKE
Filed Aug. 21, 1931  2 Sheets-Sheet 2

Inventor
Charles Pearson
By H.P. Davis
Atty.

Patented Nov. 22, 1932

1,888,468

UNITED STATES PATENT OFFICE

CHARLES PEARSON, OF CICERO, ILLINOIS, ASSIGNOR TO INTERNATIONAL HARVESTER COMPANY, A CORPORATION OF NEW JERSEY

SELF-DUMP RAKE

Application filed August 21, 1931. Serial No. 558,505.

This invention relates to rakes of the self dumping type. More particularly it relates to a locking lever for a corn stalk rake.

The principal object of the invention is to provide a locking means for positively holding the rake in operative position until it is dumped. Another object is to provide locking means automatically engageable when the rake is dropped to operative position and releasable by the operation of the dumping mechanism. These objects are obtained by the mechanism illustrated in the accompanying drawings, in which.

Figure 1:
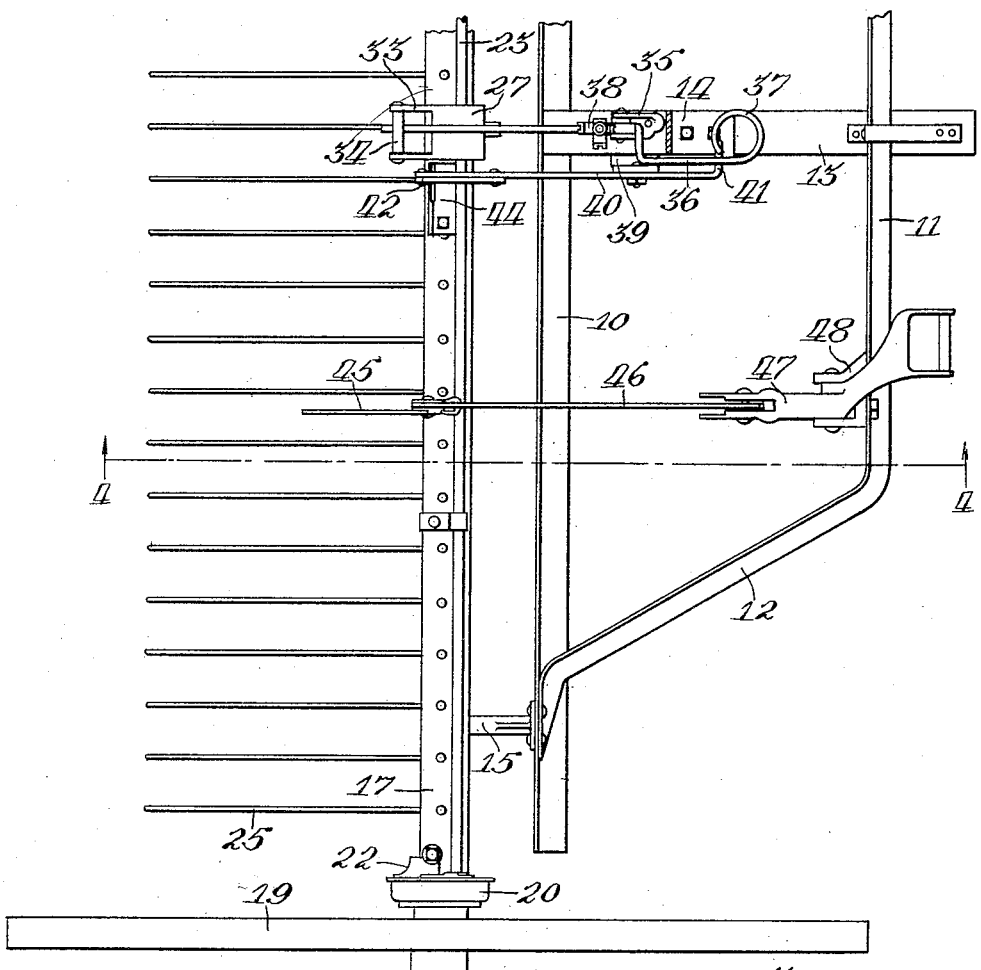
Figure 1 is a plan view of a rake embodying the invention, one end being broken away as it is similar in construction to the end shown.
Figure 2:
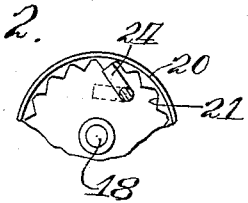
Figure 2 is an enlarged detail showing the clutch mechanism for engaging the ground wheels when dumping the rake.

The rake illustrated as embodying the invention is substantially the same in construction as that shown in my Patent No. 1,000,438. A draft frame consisting essentially of a transverse rear member 10 and a forward member 11 connected by angularly extending end portions 12 to the member 10, is secured to a tongue 13. The tongue 13 also serves as a support for mounting the operator's seat 14 and certain of the dumping mechanism, as will be hereinafter described. Rearwardly extending brackets 15 rigidly secured to the rear frame member 10, extend upwardly and are pivotally attached to brackets 16 rigidly secured to a transversely extending angle bar 17 usually formed as a rake head in devices of this type. The bar 17 has stub axles 18, not shown in detail, secured at each end, on which ground wheels 19 are rotatably mounted. An annular clutch member 20 is secured to each wheel for rotation therewith. Internally said members are provided with a plurality of notches 21.

At each end of the bar 17 a member 22, formed as a casting, is rigidly secured to the angle bar and forms a closure over the open face of the clutch member 20. From the center of the rake, rods 23 extend laterally in each direction. Said rods extend through openings in the castings 22 and are provided with a right angle portion 24 which form latches engageable with the notches 21 upon rotation of the rods 23 in the proper direction. A plurality of rake teeth 25 of a conventional shape, are secured to the bar or rake head 17.

Figure 3:
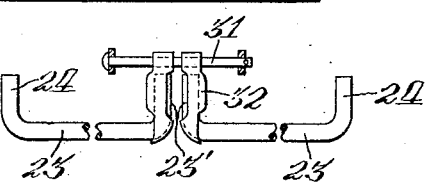
Figure 3 is an enlarged detail showing a portion of the connection between the dumping clutch and the actuating mechanism therefor.
Figure 4:
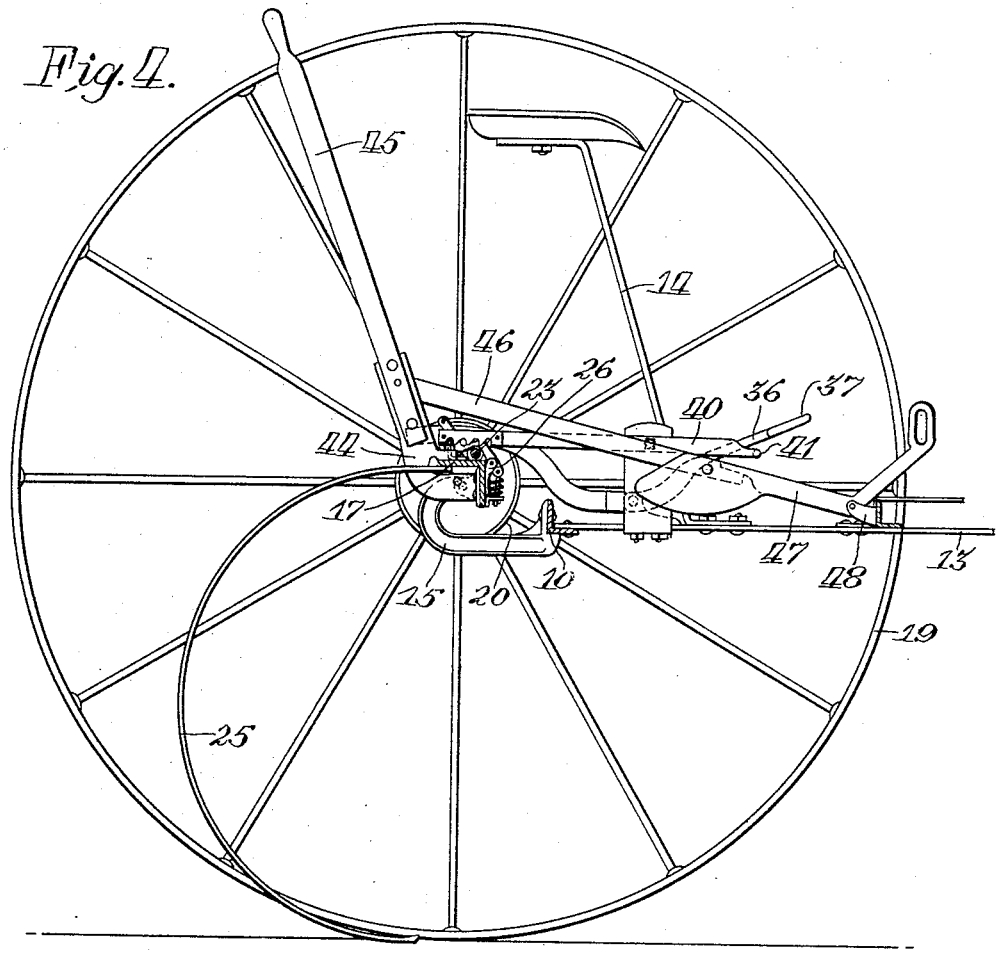
Figure 4 is a sectional view taken on the line 4—4 of Figure 1.
Figure 5:
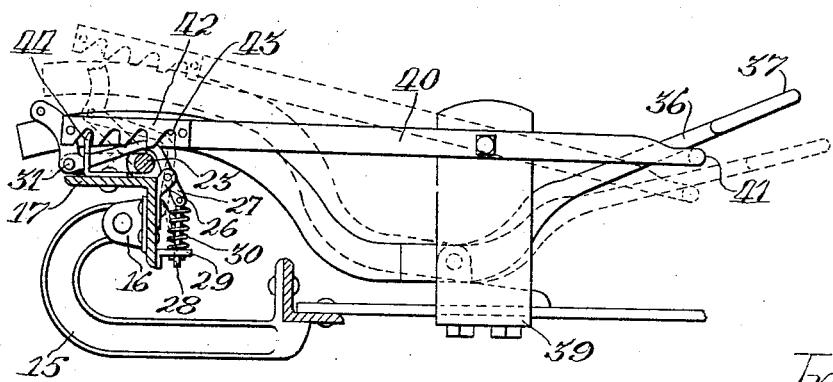
Figure 5 is an enlarged view of a portion of Figure 4 showing the locking means of the invention in two positions.

At a central location along the bar 17 a bracket 26 is secured to the vertical portion of said angle bar, extending upwardly therefrom. A member 27 is pivoted on said bracket on a longitudinal axis. Said member extends downwardly beyond the bracket and is connected at that point to a rod 28 which slidably extends through a bracket 29 secured to the bar 17. A compression spring 30 is fitted around the rod 28 to provide means for resisting the downward movement of this end of the member 27. Above the bracket 26 the member 27 curves over the adjacent end portions of the rods 23 and rearwardly therefrom. A pin 31 extends through bearing ears formed at the rear portion of the member 27. As best shown in Figure 3, said pin extends through a pair of small members 32 formed as castings shaped to engage right angle end portions 23′ formed on the rods 23.

As best shown in Figure 1, above the pin 31 the member 27 is provided with two spaced upwardly projecting ears 33. A roller 34 is mounted on a bolt extending between said ears.

A bearing bracket 35 is rigidly secured on the element 13 of the draft frame forwardly of the member 10. A lever 36, formed with a pedal portion 37, extends downwardly through a pivot block 38 and upwardly therefrom with a curved portion fitting between the ears 33 on the actuating member 27 and under the roller 34. The pivot block 38 is secured to the bracket 35 for oscillation on a transverse axis.

An upstanding bracket 39, rigidly secured to the element 13 of the draft frame, provides a means of pivotally attaching a locking lever 40. Said lever is pivoted intermediate its ends on the bracket 39, the forward end having a right angle extension 41 extending under the forward portion of the lever 36. The rearwardly extending end of the lever 40 is provided with a reinforcing block 42, said block and the lever being formed with a plurality of spaced notches 43. A latch member 44 is secured to the member 17 beneath the lever 40 and extends upwardly for engagement with the notches 43.

Laterally of the dumping mechanism, as above described, a bracket 44, rigidly secured to the bar 17, extends upwardly therefrom. A hand lever 45 is rigidly secured to the bracket 44 and is positioned within reach of the operator. A link 46, pivotally connected to the bracket 44 at a point spaced above the bar 17, is pivotally secured to a weighted link 47. The link 47 is pivotally connected to a bracket 48 secured to the forward member 11 of the draft frame. An upward extension on the member 48 forms a foot pedal against which the operator may place his foot. The links 47 and 46 are substantially in alignment and form a toggle linkage.

In the operation of the device of the invention as above described, the rake is moved forwardly over material to be gathered. When collecting corn stalks, which are much heavier than hay ordinarily collected with rakes of this type, considerable pressure is exerted rearwardly against the rake teeth 25. This pressure exerts a considerable torque against the rake head 17. When the rake is to be dumped the operator removes his foot from the pedal on the link 47 and presses downwardly on the pedal portion 37 of the lever 36. The end extension 41 on the lever 40 extends under the lever 36 so that upon slight downward movement of the lever 36 the rear end of the lever 40 is raised, disengaging the notches 43 from the latch member 44. Upon further downward movement of the forward end of the lever 36 the rear end engages the roller 34 and lifts the actuating member 27 about its pivot point against the compression of the spring 30. The pin 31 is lifted with said member, raising the forward ends of the members 32 and rotating the rods 23. Upon rotation of said rods the end portions 24 engage the notches 21 in the clutch member and lock the rake head for rotation with the wheels. The rake teeth are thereby lifted, dumping the accumulated material.

When the operator's foot is removed from the lever 36, the member 27 is pushed back to its original position by the spring 30, thereby disengaging the wheels 19 from the rake head. The rake head turns rearwardly and the rake teeth are dropped into operating position. As soon as the forward end of the lever 36 moves upwardly, the rear end of the lever 40 drops downwardly and automatically engages one of the notches 43 with the latch member 44. It is, therefore, unnecessary for the operator to maintain pressure on the pedal portion of the link 47 as the engagement of the latch member with the notches forms a lock, preventing rotation of the rake head.

It is to be understood that applicant has shown only a preferred embodiment of his means for locking a rake in operative position and that he claims as his invention all modifications falling within the scope of the appended claims.

What is claimed is:

1. In a rake having a draft frame and a rake head pivotally connected thereto on a transverse axis, the combination of power lift means for rotating said rake head, tripping means for actuating said power lift means, latch means connected to the draft frame operative to positively engage and hold the rake head in operative position, and means to disengage said latch means prior to operation of the tripping means.

2. In a rake having a draft frame and a rake head pivotally connected thereto on a transverse axis, the combination of power lift means for rotating said rake head, tripping means for actuating said power lift means, latch means connected to the draft frame operative to positively engage and hold the rake head in operative position, and means to disengage said latch means operable by tripping means prior to operation of the tripping means.

3. A rake comprising a draft frame, a rake head pivotally connected thereto on a transverse axis, wheels rotatably mounted at the ends of said rake head, power lift means connecting said wheels and said rake head, an actuating member pivoted on the rake head, operating connections between said member and the power lift means, a tripping lever mounted on the draft frame and operably connected to said actuating member, a latch bar pivoted on the draft frame, a latch member on the rake head engageable by the latch bar when the rake head is in operative position, and means for releasing said bar prior to operation of the power lift means.

4. A rake comprising a draft frame, a rake head pivotally connected thereto on a transverse axis, wheels rotatably mounted at the ends of said rake head, power lift means connecting said wheels and said rake head, an actuating member pivoted on the rake head, operating connections between said member and the power lift means, a tripping lever mounted on the draft frame and operably connected to said actuating member, a latch bar pivoted on the draft frame, a latch member on the rake head engageable by the latch bar when the rake head is in operative position, and means operable by the tripping lever for releasing said bar prior to operation of the power lift means.

5. A rake comprising a draft frame, a tooth supporting bar pivotally connected on a transverse axis to said frame, rake teeth secured to said bar, wheels rotatably mounted at the end of said bar, means for locking said wheels with respect to said bar whereby the bar may be rotated to lift the rake teeth, an actuating member pivoted on the supporting bar, operating connections between said member and the locking means, a lever mounted on the draft frame operable to rotate said actuating member, a latch member on the supporting bar, a latch bar pivoted on the draft frame operable to positively engage the latch member when the rake teeth are in operative position, thereby locking the tooth supporting bar against rotation, and means for disengaging the latch bar prior to operation of the locking means.

6. A rake comprising a draft frame, a tooth supporting bar pivotally connected on a transverse axis to said frame, rake teeth secured to said bar, wheels rotatably mounted at the end of said bar, means for locking said wheels with respect to said bar whereby the bar may be rotated to lift the rake teeth, an actuating member pivoted on the supporting bar, operating connections between said member and the locking means, a lever mounted on the draft frame operable to rotate said actuating member, a latch member on the supporting bar, a latch bar pivoted on the draft frame operable to positively engage the latch member when the rake teeth are in operative position, thereby locking the tooth supporting bar against rotation, and means operable by the lever on the draft frame to disengage the latch bar prior to actuation of the locking means.

In testimony whereof I affix my signature.

CHARLES PEARSON.